(12) United States Patent
Sato et al.

(10) Patent No.: US 7,628,079 B2
(45) Date of Patent: Dec. 8, 2009

(54) METHOD FOR MEASURING SHEAR LOAD OF FASTENING TOOL

(75) Inventors: Keiichi Sato, Wako (JP); Hideaki Murayama, Tokyo (JP); Kazuro Kageyama, Ushiku (JP)

(73) Assignee: Honda Motor Co., Ltd., Tokyo (JP)

( * ) Notice: Subject to any disclaimer, the term of this patent is extended or adjusted under 35 U.S.C. 154(b) by 138 days.

(21) Appl. No.: 11/645,049

(22) Filed: Dec. 26, 2006

(65) Prior Publication Data

US 2007/0144267 A1 Jun. 28, 2007

(30) Foreign Application Priority Data

Dec. 27, 2005 (JP) ............................ P2005-376077

(51) Int. Cl.
*F16B 31/02* (2006.01)
(52) U.S. Cl. ........................................................ 73/761
(58) Field of Classification Search ................... 73/761, 73/800, 849
See application file for complete search history.

(56) References Cited

U.S. PATENT DOCUMENTS

| | | | | | |
|---|---|---|---|---|---|
| 3,718,065 | A | * | 2/1973 | Liber | 411/14 |
| 3,823,639 | A | * | 7/1974 | Liber | 411/14 |
| 4,676,109 | A | * | 6/1987 | Wallace | 73/761 |
| 5,220,839 | A | * | 6/1993 | Kibblewhite | 73/761 |
| 5,274,226 | A | * | 12/1993 | Kidwell et al. | 250/227.16 |
| 5,339,696 | A | * | 8/1994 | Carignan | 73/862.041 |
| 5,461,923 | A | * | 10/1995 | Meisterling | 73/761 |
| 5,637,865 | A | * | 6/1997 | Bullat et al. | 250/227.14 |
| 5,945,665 | A | * | 8/1999 | Hay | 250/227.14 |
| 6,069,985 | A | * | 5/2000 | Albin et al. | 385/12 |
| 6,101,884 | A | * | 8/2000 | Haake | 73/800 |
| 6,354,152 | B1 | * | 3/2002 | Herlik | 73/597 |
| 6,951,137 | B2 | * | 10/2005 | Smith et al. | 73/761 |
| 6,990,866 | B2 | * | 1/2006 | Kibblewhite | 73/761 |
| 7,277,162 | B2 | * | 10/2007 | Williams | 356/32 |

FOREIGN PATENT DOCUMENTS

JP 2004-212210 A 7/2004

OTHER PUBLICATIONS

Oyo Buturi, Applied Physics, vol. 69, No. 06, pp. 0648-0654 (2000).

* cited by examiner

*Primary Examiner*—Lisa M Caputo
*Assistant Examiner*—Freddie Kirkland, III
(74) *Attorney, Agent, or Firm*—Birch, Stewart, Kolasch & Birch, LLP

(57) ABSTRACT

A method for measuring shear load of a fastening tool, which comprises the steps of: positioning an optical fiber sensor on a surface of a fastening tool to be subjected to a measurement, or within the tool but near the surface thereof, so that the optical fiber sensor is positioned along a direction of an axis the fastening tool; and measuring the shear load acting on the fastening tool on the basis of a change in an optical characteristic of the optical fiber sensor that directly corresponds to a deformation of the fastening tool when the shear load is applied to the fastening tool.

17 Claims, 14 Drawing Sheets

FIG.15A 0Kgf 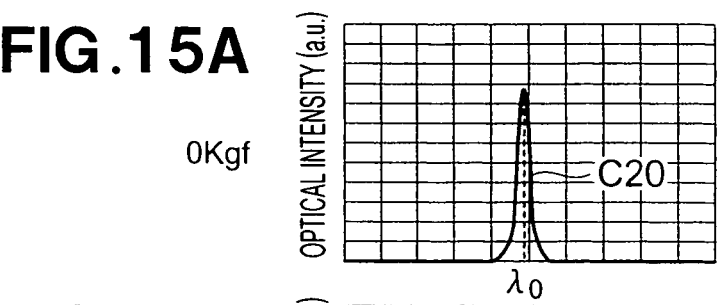
FIG.15B 40Kgf 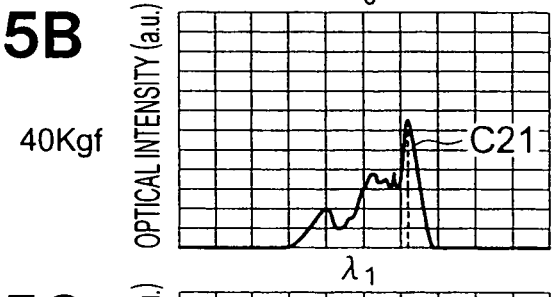
FIG.15C 80Kgf 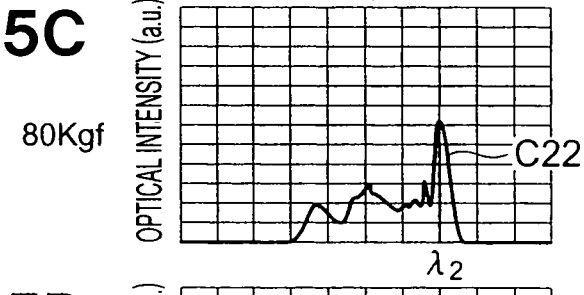
FIG.15D 120Kgf 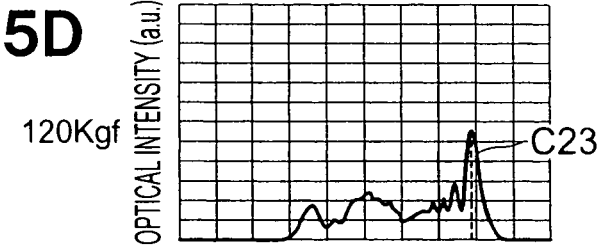
FIG.15E 160Kgf 
FIG.15F 200Kgf 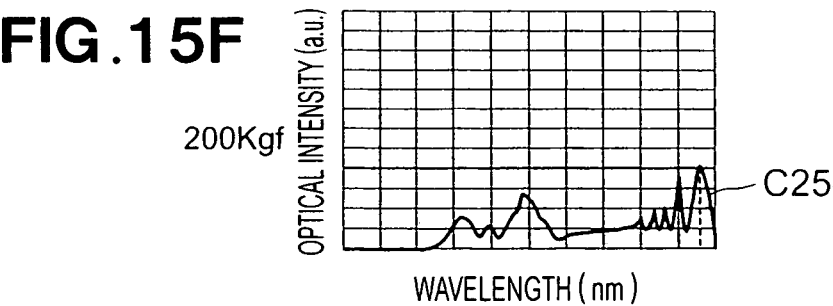

FIG.16A 0Kgf
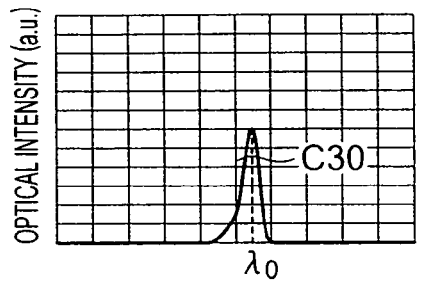
FIG.16B 40Kgf
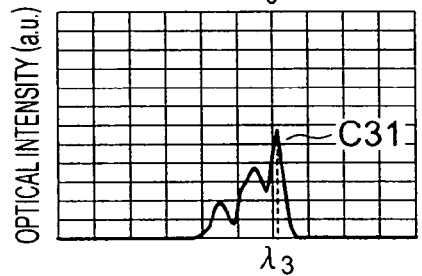
FIG.16C 80Kgf
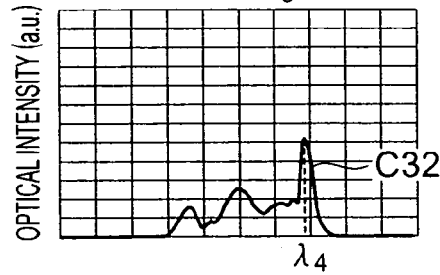
FIG.16D 120Kgf
FIG.16E 160Kgf
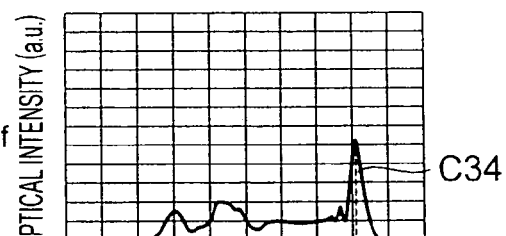
FIG.16F 200Kgf
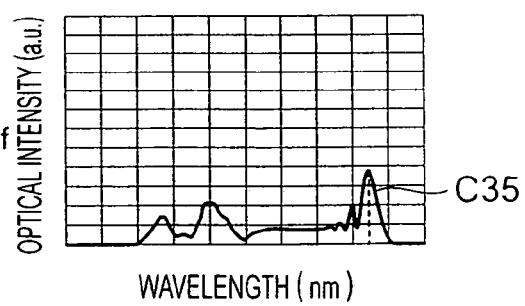

FIG.17A 0Kgf
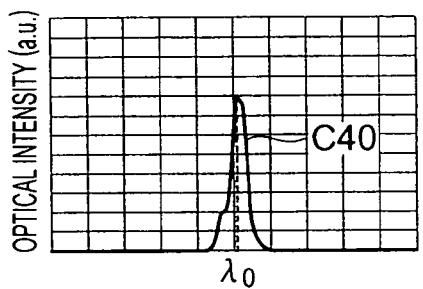
FIG.17B 40Kgf
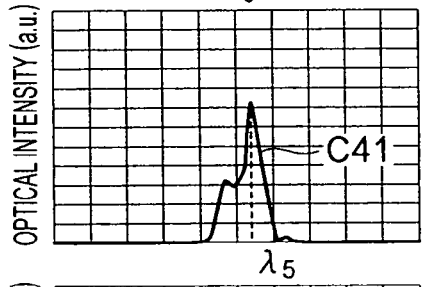
FIG.17C 80Kgf
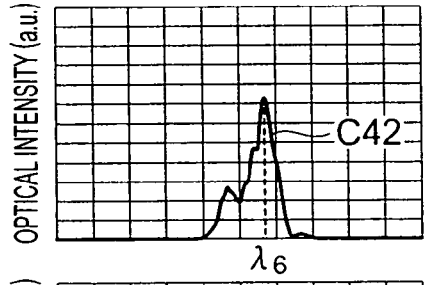
FIG.17D 120Kgf
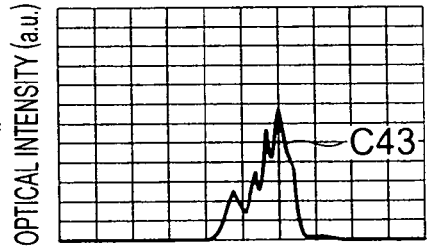
FIG.17E 160Kgf
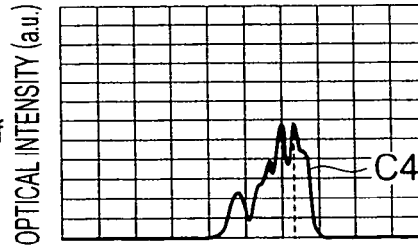
FIG.17F 200Kgf
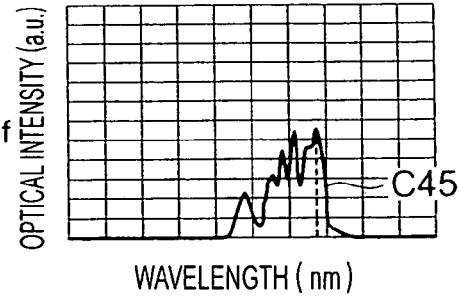

FIG.18A 0Kgf
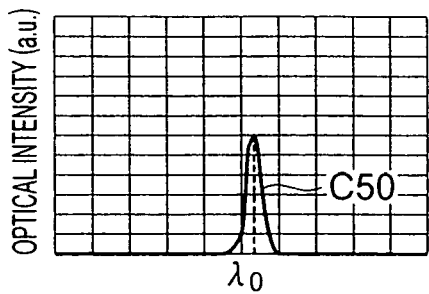
FIG.18B 40Kgf
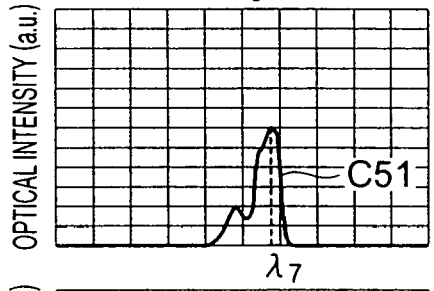
FIG.18C 80Kgf
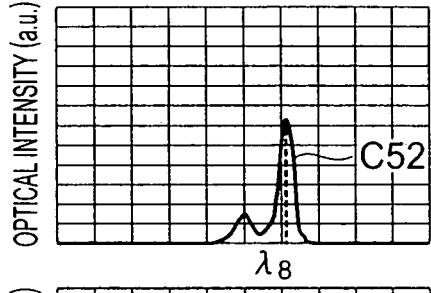
FIG.18D 120Kgf
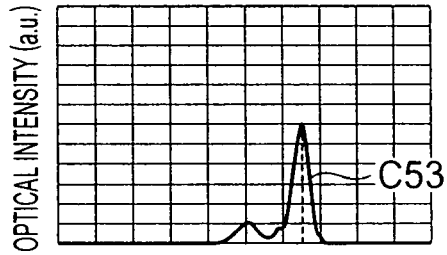
FIG.18E 160Kgf
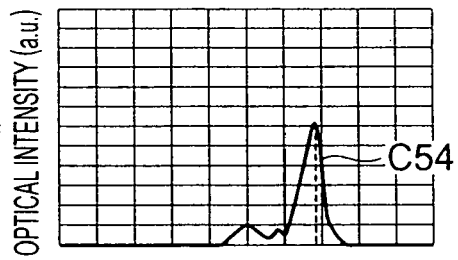
FIG.18F 200Kgf
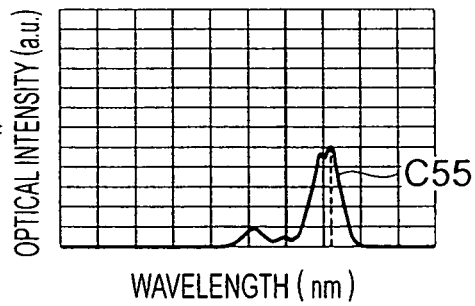
WAVELENGTH (nm)

METHOD FOR MEASURING SHEAR LOAD OF FASTENING TOOL

FIELD OF THE INVENTION

The present invention relates to a method for measuring shear load of a fastening tool and particularly relates to a method for measuring shear load of a fastening tool that uses an optical fiber sensor.

BACKGROUND OF THE INVENTION

Bolted joints in aircraft transmit large loads and are usually fastened using a plurality of bolts in order to lower the surface pressure between members and increase redundancy. Bolts used in such bolted joints are subjected to loads and shear forces from the parts used to form the holes into which the bolts are inserted. The actual load (load distribution) on each of the bolts of a bolted joint in such instances varies in accordance with the deformation of each bolt and hole. Rigorous predictions of the actual load on each bolt in a bolted joint are therefore difficult to make merely by using finite element method (FEM) analysis, which is usually used for stress analysis. It is also difficult to verify the accuracy of the results of analysis made using the finite element method. Designs tending to extreme safety have therefore generally been implemented wherein the load on each bolt is significantly lower than the allowable yield strength yield strength per bolt. Breaking tests must be performed on the actual mechanical elements of the bolted joint in order to determine the load on each bolt of a bolted joint.

The analytically optimal design of bolted joints, which transmit large loads in aircraft and the like, has thus been difficult. If the actual load distribution of the bolts was known, analysis of the actual load in a bolted joint would be simplified, the precision of designs for bolted joints would be increased, and optimal designs that are lighter and more reliable than conventional designs could be created. So far, however, no precise method has yet emerged for directly measuring bolt load distribution; the only method has involved indirectly measuring the load distribution of the bolts by attaching strain gauges to the perimeter of the bolt holes and measuring strain at those locations.

A technique has been conceived in order to solve such problems, wherein the shear load of a bolt is measured by embedding an optical fiber sensor within the solid shaft of the bolt (see JP-A-2004-212210, for example). This method involves detecting the amount of axial strain of the solid shaft via the optical fiber sensor and measuring the shear stress acting on the solid shaft based on the detected amount of axial strain and the Poisson effect.

A description of a technique for precision measurement using optical fiber sensors is disclosed in the literature (Ishikawa, S., Technique for precision measurement using optical fiber gratings. *Applied Physics* 2000, 69.6, 648-654, Jun. 10, 2000).

In the method disclosed in the aforementioned patent document, the amount of axial strain observed by the optical fiber sensor must be converted to shear stress based on the Poisson effect in order to determine the shear load on the bolt. The optical fiber sensor must therefore be fixed within the bolt so that the strain of the bolt accurately corresponds to the strain of the optical fiber sensor within the bolt in order to accurately measure the amount of strain in the direction of the solid shaft of the bolt. Fixing the optical fiber sensor in this manner has been extremely difficult.

Accordingly, a demand has arisen for establishing a method for measuring shear load of a fastening tool whereby the shear load on the fastening tool is directly measured based on optical characteristics detected by an optical fiber sensor provided to a location in proximity to the surface of the fastening tool, and the measurement precision can be rapidly enhanced.

SUMMARY OF THE INVENTION

According to the present invention, there is provided a method for measuring a shear load of a fastening tool, which comprises the steps of: positioning an optical fiber sensor on a surface of a fastening tool to be subjected to a measurement, or within the tool but near the surface thereof, so that the optical fiber sensor is positioned along a direction of an axis of the fastening tool; and measuring the shear load acting on the fastening tool on the basis of a change in an optical characteristic of the optical fiber sensor that directly corresponds to a deformation of the fastening tool when the shear load is applied to the fastening tool.

In accordance with the invention, since the optical fiber sensor is provided to a location proximate to and along the longitudinal surface of the fastening tool, the shear load on the fastening tool can be precisely measured because the shear load is measured based on changes in the optical characteristics of the optical fiber sensor corresponding to deformations of the fastening tool caused by shear load.

Preferably, the deformation in the aforementioned method for measuring a shear load is bending deformation.

Desirably, the shear load measuring step comprises determining the shear load based on a database that relates an optical characteristic with a corresponding shear load.

In a preferred form, the optical fiber sensor is positioned parallel to an axis of the fastening tool.

The optical fiber sensor may be disposed helically around the axis of the fastening tool.

The optical fiber sensor may be embedded via an adhesive in a channel formed in the surface of the fastening tool in a direction of the axis.

In a preferred form, the optical-fiber sensor part has a length substantially equal to a thickness of at least two overlaid fastened members.

Preferably, the length of the optical-fiber sensor part is identical to a length of a trunk part of a fastening part, which is composed of a head part, the trunk part, and a screw part.

Desirably, the optical fiber sensor comprises an optical fiber grating sensor.

The optical characteristic may be a reflected light characteristic.

The optical characteristic may be an optical transmission characteristic.

According to the above shear load measuring method of the present invention, even in structures wherein a plurality of members are fastened with numerous fastening tools for purposes of redundancy, the shear load acting on individual fastening tools can be accurately measured, considerably higher levels of structural design can be attained, and attributes such as the reliability and weight of the structures can be improved.

The optical fiber sensor is positioned in proximity to the outer surface of the fastening tool, whereby the sensitivity when measuring the amount of tensile or compressive strain due to bending deformation can be greatly increased and higher precision can be expected for measurements of shear strain. The degree of bending deformation is smallest and measurement sensitivity decreases when the optical fiber sensor is positioned inside the center of the fastening tool.

Since the optical fiber sensor is disposed in a shallow (0.3 mm) channel on an outer surface of the fastening tool, high precision may be expected, while the positioning operation is straightforward and exceptionally reproducible. The measurement sensitivity is also readily improved. In addition, the fact that the channel is shallow means that the shaft diameter of the fastening tool is substantially unaffected and no correction needs to be made for the channel, allowing shear load to be obtained with high precision.

The measurement sensitivity can be maintained even if the thickness of the fastened members varies, irrespective of where the shear plane is located on the fastening tool. According to the present invention, furthermore, shear load results can be obtained with a single measuring instrument irrespective of the thickness of the fastened members. Therefore, the measuring tool offers an exceptionally broad range of application, and large reductions in the cost of the measuring tool may be expected.

BRIEF DESCRIPTION OF THE DRAWINGS

Certain preferred embodiments of the present invention will be described in detail below, by way of example only, with reference to the accompanying drawings, in which:

FIGS. 15A to 15F illustrate spectral data of reflection from the optical fiber sensor when a variety of shear loads are applied to a bolt;

FIGS. 16A to 16F illustrate spectral data of reflection from the optical fiber sensor when a variety of shear loads are applied to a bolt;

FIGS. 17A to 17F illustrate spectral data of reflection from the optical fiber sensor when a variety of shear loads are applied to a bolt;

FIGS. 18A to 18F illustrate spectral data of reflection from the optical fiber sensor when a variety of shear loads are applied to a bolt;

DESCRIPTION OF THE PREFERRED EMBODIMENTS

Figure 1:
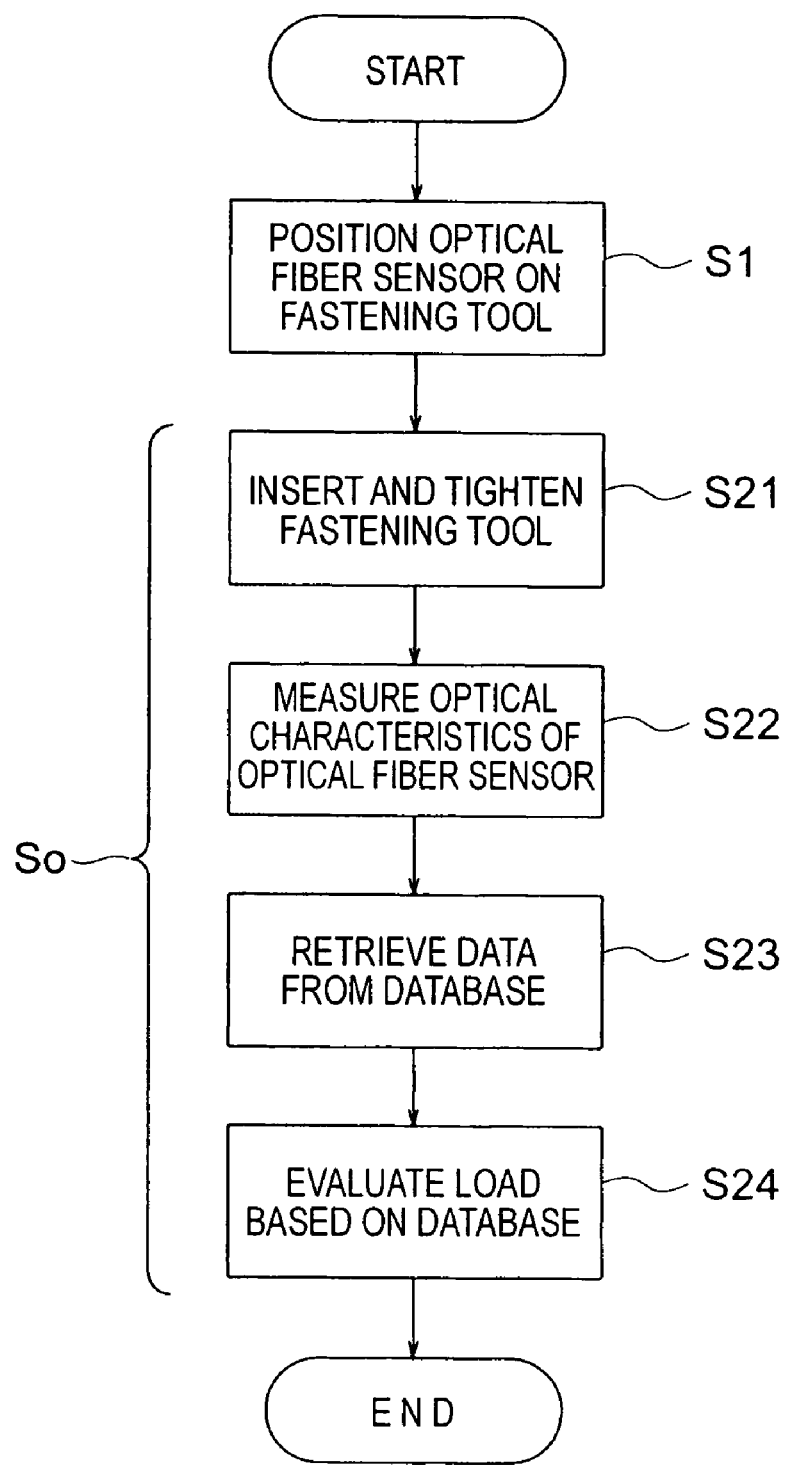
FIG. 1 is a flow chart showing a method for measuring shear load on a fastening tool, according to a first embodiment of the present invention.

Initial reference is made to the flow chart of FIG. 1 showing a method for measuring shear load on a fastening tool, according to a first embodiment of the present invention.

The method for measuring shear load on a fastening tool comprises: a sensor-positioning step S1 for positioning an optical fiber sensor on a surface of a fastening tool to be subjected to a measurement, or within the tool but near the surface (at a location proximal to the surface) thereof, so that the optical fiber sensor is positioned along a direction of an axis (longitudinal direction) of the fastening tool; and a measuring step S2 for measuring shear load acting on the fastening tool, based on a change in an optical characteristic of the optical fiber sensor that directly corresponds to a deformation of the fastening tool when shear load is applied to the fastening tool.

The measuring step S2 further comprises: a step S21 for inserting and tightening the fastening tool; a step S22 for measuring the optical characteristics of the optical fiber sensor in the inserted and tightened fastening tool; a step S23 for retrieving data from a database that relates optical characteristics with corresponding shear loads; and a step S24 for evaluating the shear load of the fastening tool on the basis of the measured optical characteristics of the optical fiber sensor and the database that relates optical characteristics with corresponding shear loads. The members, equipment, and data used in each step of the method for measuring shear load on a fastening tool will be explained and described in detail below.

Figure 2:
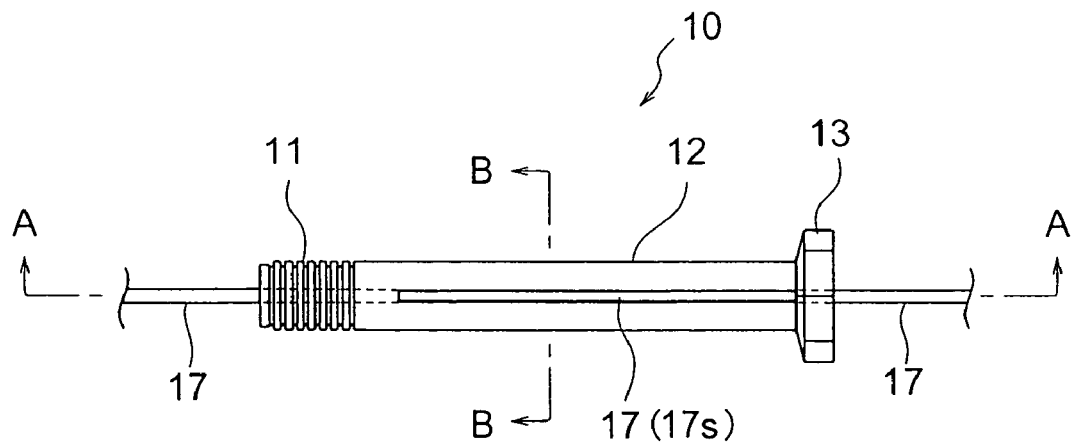
FIG. 2 is a front view showing a fastening tool and optical fiber sensor used in the shear load measuring method according to the first embodiment.

FIG. 2 shows a front view of a fastening tool provided with an optical fiber sensor on the surface of the fastening tool along the longitudinal surface. The fastening tool is obtained as a result of the execution of the sensor-positioning step S1.

The fastening tool of the present embodiment is a bolt 10. The bolt 10 has a screw part 11, a trunk part 12, and a head part 13. One channel 14 is formed parallel to the axial direction in the surface of the trunk part 12. Holes 15, 16 are formed through the screw part 11 and the head part 13. The channel 14 and the two holes 15, 16 are made to form a single passage in the bolt 10. An optical fiber sensor 17 is put in place using this passage. Specifically, the optical fiber sensor 17 is inserted in the holes 15, 16 and embedded in the channel 14. The part of the optical fiber sensor 17 that is embedded in the channel 14 functions as a sensor part 17s. The optical fiber sensor 17, which is positioned in the channel 14 and the holes 15, 16 of the bolt 10, is bonded with an adhesive 18 and fixed to the bolt 10.

The optical fiber sensor 17 uses an optical fiber grating sensor, for example. The use of a fiber Bragg grating (FBG) is particularly recommended. An example that uses an optical fiber grating sensor will be described below.

The length of the sensor part 17s of the optical fiber sensor 17 and the length of the groove 14 that is formed in the trunk part 12 of the bolt 10 are designed to be of substantially the same length. The length of the sensor part 17s is preferably of a length equal to the thickness of at least two overlaid plate-shaped members to be fastened. The length of the sensor part 17s is also preferably equal to the length of the trunk part 12 of the bolt 10. In the embodiment described hereinafter, for example, the size of the bolt 10 is φ=4.8 mm, with a full length of 36 mm, and the length of the trunk part 12 is 30 mm. An optical fiber sensor 17 having a length of 25 mm for the sensor part 17s was used.

Figure 3:
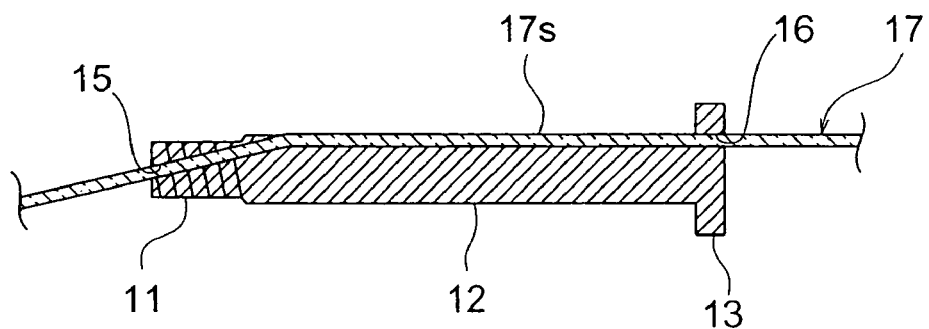
FIG. 3 is a sectional view taken along line A-A of FIG. 2.
Figure 5:
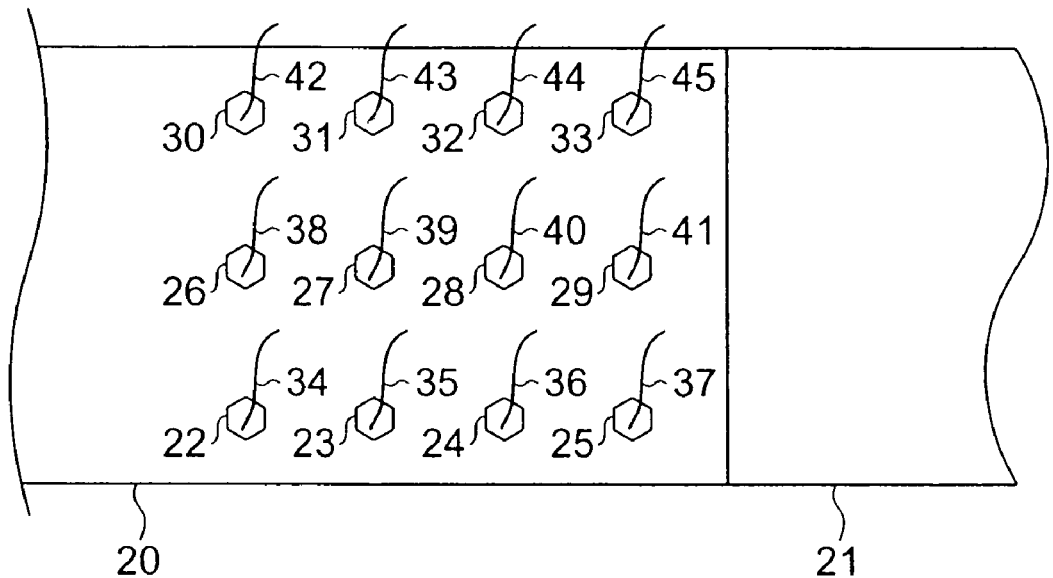
FIG. 5 is a front view showing the configuration when measuring the load on each bolt in a bolted joint.
Figure 6:
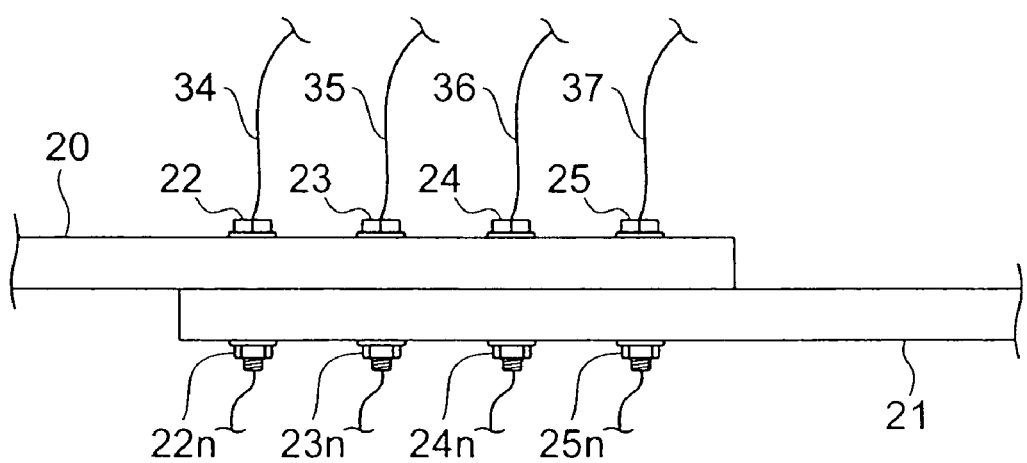
FIG. 6 is a side view showing the configuration when measuring the load on each bolt in a bolted joint.

FIGS. 5 and 6 are a front view and a side view, respectively, that show the configuration when measuring the load on each bolt of a bolted joint. A plate 20 and a plate 21, which have already had fastening tools inserted and tightened via step S21, are shown in FIG. 5 and FIG. 6 in a state wherein a plurality of bolts 22 through 33, which have a structure identical to the bolt 10, as well as nuts are inserted. The nuts are provided to the rear side in FIG. 5, but some of the nuts, nuts 22n through 25n, are shown in FIG. 6. Optical fiber sensors 34 through 45, which are identical to the optical fiber sensor shown in FIGS. 2 and 3, are inserted into each bolt.

The force of tightening of each bolt and the positional relationship between the optical fiber sensors 34 through 45 and the axis of the bolt and are measured, recorded, and saved for each bolt 22 through 33 in the structure wherein the plates 20, 21 are fastened together by the bolts 22 through 33.

The optical characteristics of the optical fiber sensors in the inserted and tightened fastening tools are measured in step S22. The measurement system used in this instance will be described below using FIGS. 7 and 8.

Figure 8:
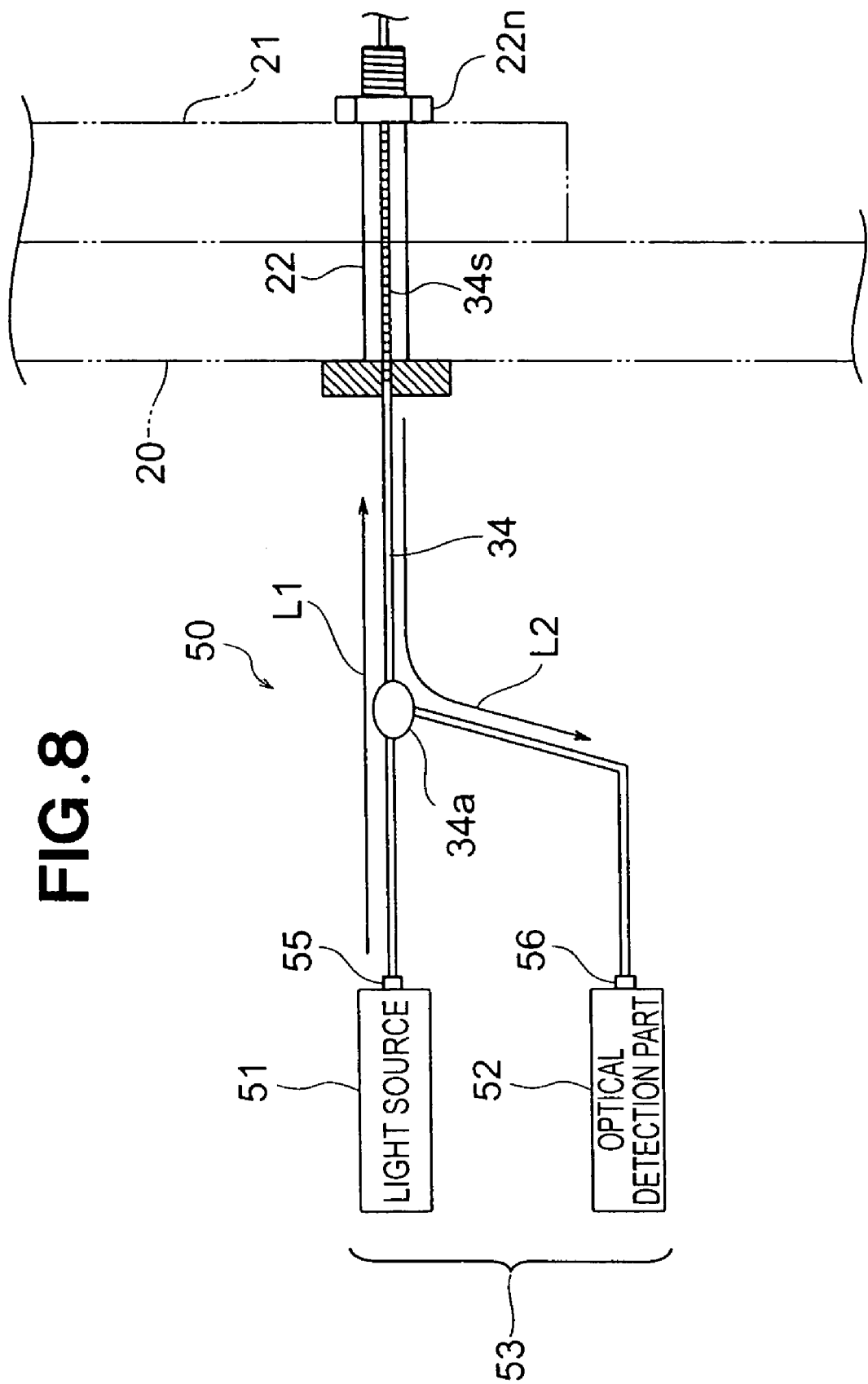
FIG. 8 is a schematic view of the measurement system used in the shear load measuring method according to the first embodiment of the present invention.

As shown in FIG. 8, a measurement system 50 is configured with the following elements: a light source 51; a measurement device 53 for analyzing optical spectra that is provided with an optical detection part 52; and a personal computer 54 for storing measurement data. Of the optical fiber sensors 34 through 45 that are provided to the plurality of bolts 22 through 33 shown in FIGS. 5 and 6, the optical fiber sensors that are provided to bolts for which shear load is to be measured are connected to a terminal 55 on the light-source side and a terminal 56 on the optical-detection-part side of the measurement device 53 for analyzing optical spectra. The measurement of the shear load on the bolt 22 will now be described as an example.

The light source 51 is a device for radiating broadband light onto the end surface on the incident side of the optical fiber sensor 34 and emits light of a wavelength region that includes light of a wavelength that is detectable by the optical fiber sensor 34. The light source 51 is a superluminescent diode (SLD), a halogen lamp, a tungsten lamp, or another light source that has a continuous broadband spectrum, for example.

The optical fiber sensor 34 has a sensor part 34s and a coupler 34a. The optical fiber sensor 34 introduces light from the light source 51 into the sensor part 34s and detects light reflected from the sensor part 34s via the coupler 34a. The tip of the optical fiber sensor 34 on the light-source side is connected to the terminal 55 of the light source 51 that is provided to the measurement device 53 for analyzing optical spectra. The tip of the optical fiber sensor 34 on the optical-detection-part side is connected to the terminal 56 of the optical detection part 52 of the measurement device 53 for analyzing optical spectra.

The optical detection part 52 that is shown in FIG. 8 has the role of obtaining the reflection spectrum of the light reflected from the sensor part 34s.

In FIG. 8, an arrow L1 refers to incident light, and an arrow L2 refers to reflected light.

The principles of measurement according to the measurement system 50 of the method for measuring shear load on a fastening tool of the present invention will be described next, using FIG. 9.

Figure 9:
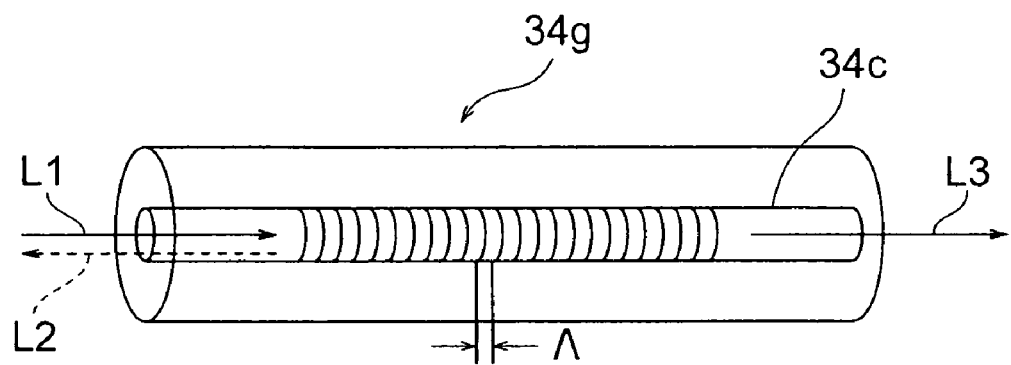
FIG. 9 is a schematic view of a fiber grating.

FIG. 9 is a schematic diagram of a fiber grating. A fiber grating (diffraction grating part) 34g of the sensor part 34s that is used as the optical fiber sensor 34 has light-wavelength-order cycles written in a fiber-core part 34c and has a function of reflecting light of a prescribed wavelength by using a coupling of forward and return modes that propagate through the core 34c. In FIG. 9, L1 refers to incident light, L2 refers to reflected light, and L3 refers to transmitted light. A coupled wavelength $\lambda_B$ is described by an equation (1) using an effective refractive index $n_{core}$ of the propagation mode and a refractive index period $\Lambda$.

$$\lambda_B = 2n_{core}\Lambda \tag{1}$$

Reflectivity R is determined by an equation (2) using a change in refractive index $\Delta n$, a grating length L, and a confinement $\eta_c$ of propagated light in the core part.

$$R_B = \tanh^2\left(\pi L \cdot \Delta n \cdot \frac{\eta_c}{\lambda_B}\right) \tag{2}$$

Figure 10:
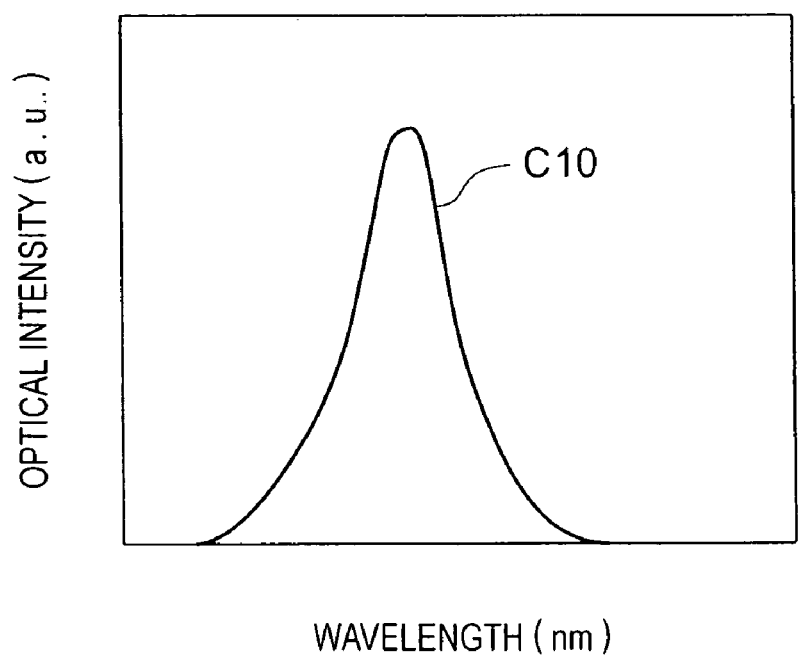
FIG. 10 is a graph showing the characteristics of reflection from the fiber grating.

In the case of a fiber grating that is used for wavelength separations of 1.55 μm-band wavelength multiplex transmission, for example, refractive index cycles having a period $\Lambda$ of approximately 0.5 μm are written over a length L of 10 mm, making approximately 20,000 layers and forming extremely steep reflection characteristics, as shown in FIG. 10. In FIG. 10, the horizontal axis indicates wavelength and the vertical axis indicates optical intensity. The reflection characteristic is shown by a curve C10.

Figure 11:
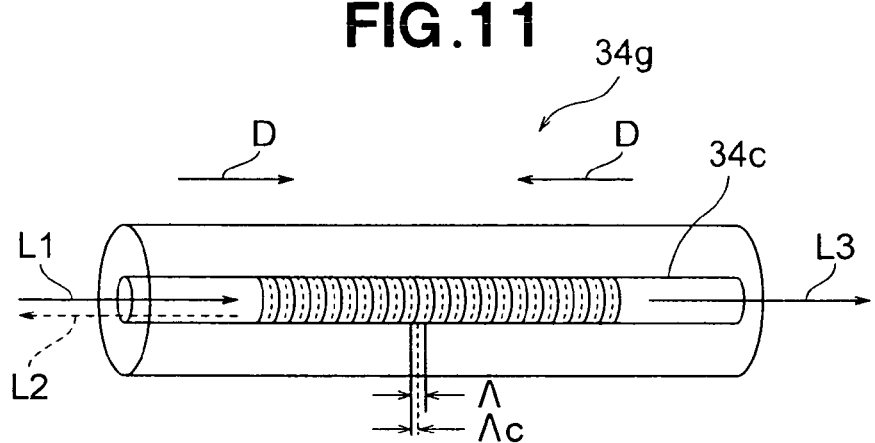
FIG. 11 is a schematic view of the grating under compressive strain.
Figure 12:
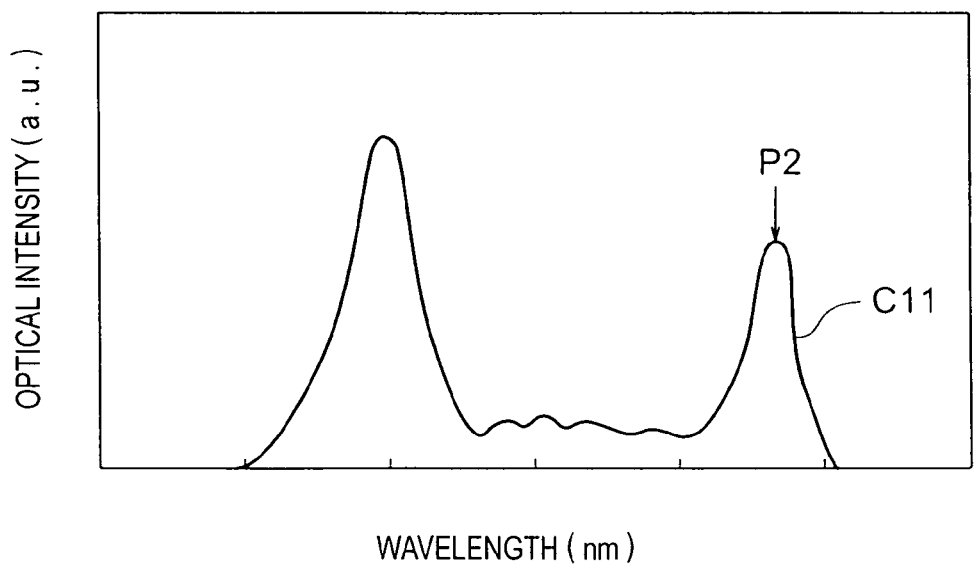
FIG. 12 is a graph showing the characteristics of reflection from the fiber grating when tensile strain is generated.

The refractive index period $\Lambda$ shortens to $\Lambda_c$ when a compressive strain D is applied to such a grating, as shown in FIG. 11, and, in accordance with the equation (1), the coupled $\lambda_B$ also shortens; specifically, the wavelength of the reflected light shortens. When tensile strain is applied, the refractive index period $\Lambda$ becomes longer than the period in a state of no strain, and the wavelength of light reflected from those sections lengthens. A reflection peak P2 is therefore also generated on the long-wavelength side, as shown in FIG. 12. In FIG. 12, the horizontal axis indicates wavelength and the vertical axis indicates optical intensity. The reflection characteristic is shown by a curve C11. Bending deformation is induced in the bolt 22 when shear force is applied thereto, and a corresponding strain is generated on the sensor part 34s that is embedded in a channel in the bolt 22, resulting in a reflection spectrum that generates a reflection peak on the long-wavelength side as shown in FIGS. 15 through 18, which will be described hereinafter.

The spectrum reflected from the optical fiber sensors 34 through 45, which are inserted in each bolt 22 through 33 shown in FIG. 5 and FIG. 6, is measured using the aforementioned measurement system 50 in accordance with the aforementioned measurement principles.

In step S23 shown FIG. 1, data is retrieved from a previously created database that relates optical characteristics with corresponding shear loads.

A method for creating a database that relates optical characteristics with corresponding shear loads will now be described.

Figure 13:
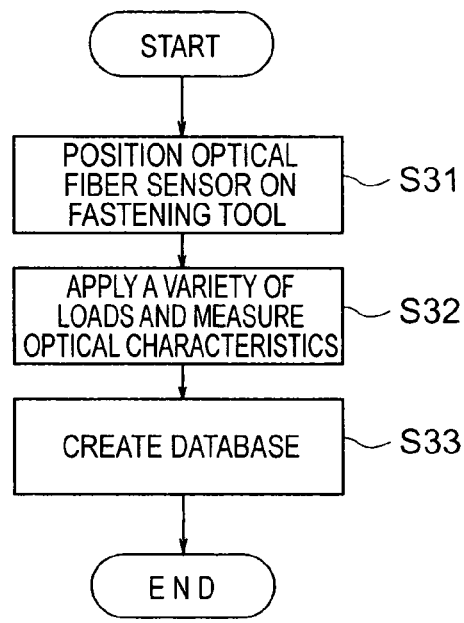
FIG. 13 is a flow chart illustrating a method for creating a database that relates optical characteristics with corresponding shear loads.

FIG. 13 is a flow chart that describes a method for creating a database that relates optical characteristics with corresponding shear loads. The method for creating a database that relates optical characteristics with corresponding shear loads comprises: a sensor-equipment step S31 for providing an optical fiber sensor to a surface along a longitudinal surface of a fastening tool; a step S32 for applying a variety of shear loads and measuring the optical characteristics of the optical fiber sensor in the fastening tool; and a step S33 for creating a database that relates optical characteristics with corresponding shear loads.

Figure 4:
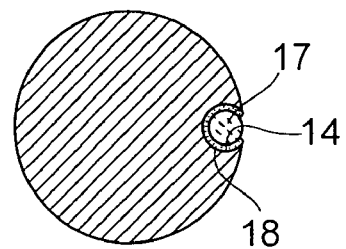
FIG. 4 is a sectional view taken along line B-B of FIG. 2.

Step S31 provides an optical fiber sensor on a surface along a longitudinal surface of a fastening tool. Since step S31 is carried out in the same manner as the aforedescribed step S1 and as shown in FIGS. 2 through 4, a description will be omitted.

Figure 14:
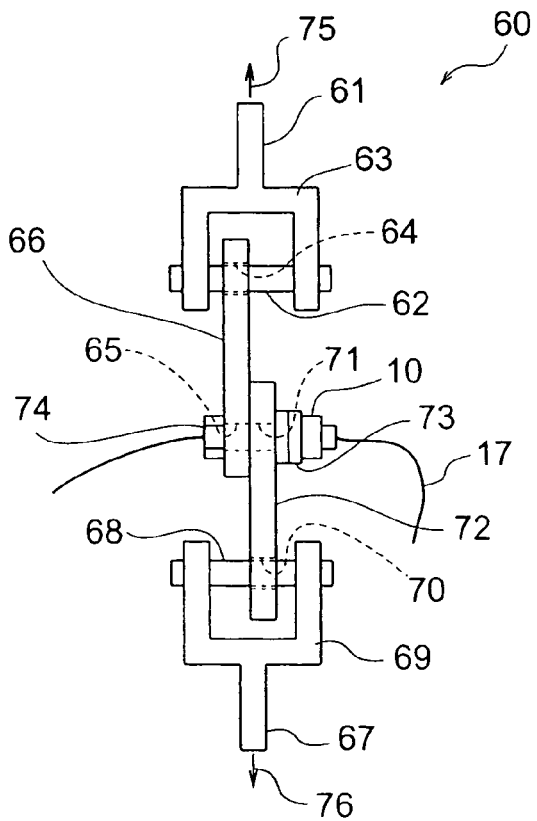
FIG. 14 is a side view of a jig used when a shear load is applied to a fastening tool.

A variety of shear loads are applied in step S32 and the optical characteristics of the optical fiber sensor in the fastening tool are measured. An example of a jig used when applying the various loads to the fastening tool is shown in FIG. 14. The aforedescribed bolt 10 is used as the fastening tool in this instance.

A jig 60 that is used when applying shear load is provided on one side with a member 63, which has a tip 61 and is provided with a pin 62, and is provided on the other side with a member 69, which has a tip 67 and is provided with a pin 68. A shear load (arrow 75) is applied to the tip 61 of the member 63, and another shear load (arrow 76) is applied to the tip 67 of the member 69. Two plates 66, 72 are further provided in the jig 60. A hole 64 through which the pin 62 passes and a hole 65 through which the bolt 10 passes are formed in the plate 66. A hole 70 through which the pin 68 passes and a hole 71 through which the bolt 10 passes are also formed in the plate 72.

The jig 60 in the state shown in FIG. 14 has the member 63 and the plate 66 connected by the pin 62, and the member 69 and the plate 72 connected by the pin 68. The two plates 66, 72 are connected by the bolt 10. A washer 73 and a nut 74 are attached to the connected bolt 10. The members 63, 69 and the plates 66, 72 are thereby connected and integrated, and the jig 60 is assembled.

A test for applying a shear load to the bolt 10 using the jig 60 is performed as follows.

The bolt 10, which is provided with the optical fiber sensor 17, is passed through and inserted into the hole 65 of the plate 66 and the hole 71 of the plate 72 via the washer 73. The screw part of the bolt 10 is fastened with a nut 74. The pin 62 passes through the hole 64 of the plate 66, and pin 68 passes through the hole 70 of the plate 72. The tip 61 of the member 63 and the tip 67 of the member 69 are attached to a loading device (not shown), and a prescribed load is applied by the loading device in the directions shown by the arrows 75, 76.

Figure 7:
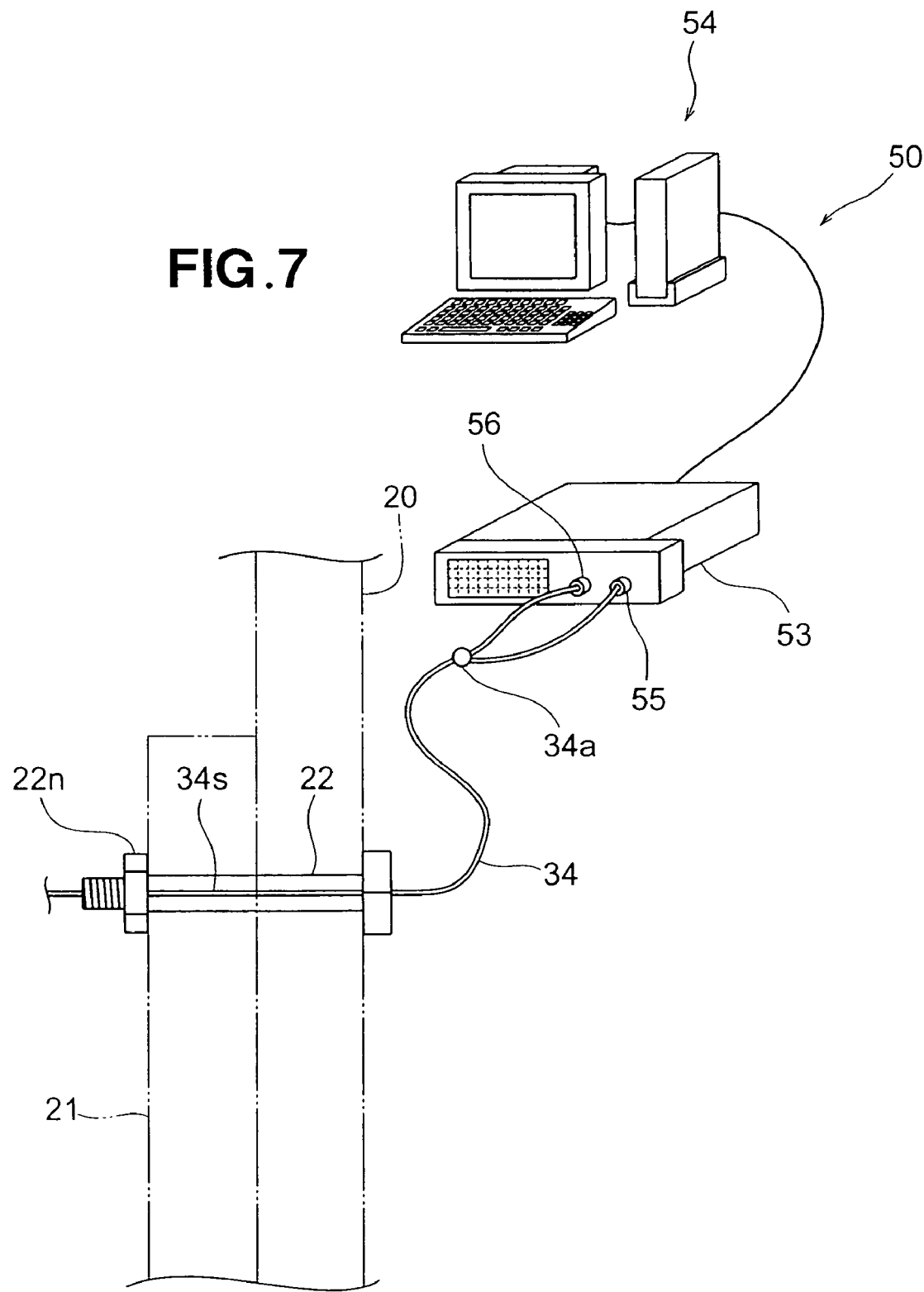
FIG. 7 is a schematic view showing the layout of a measurement system used in the shear load measuring method according to the first embodiment of the present invention.

Spectra of reflection from the optical fiber sensor 17 are measured when a variety of shear loads are applied to the bolt 10 using the jig 60 as described above and connecting the optical fiber sensor 17 to the measurement system 50 shown in FIGS. 7 and 8. A database that relates optical characteristics with corresponding shear loads is created in step S33 by using the personal computer 54 to store the measured reflection spectra for the a variety of shear loads.

Using FIGS. 15A through 15F, FIGS. 16A through 16F, FIGS. 17A through 17F, and FIGS. 18A through 18F, the creation of a database of reflection spectra for shear loads will be described next as an example of a database that relates optical characteristics with corresponding shear loads.

FIGS. 15A through 15F are spectral data of reflection from the optical fiber sensor 17 when a variety of shear loads were applied to the bolt 10. These measurements are data for when the direction of the line segment that joins the central axes of the sensor part 17s and the bolt 10 was parallel to the direction of the shear load, and when the force with which the bolt is tightened 10 was relatively weak. These data are used to form a database. The horizontal axis represents the wavelength and the vertical axis represents the optical intensity.

When a shear load is not applied; i.e., when the load is 0 kgf, as shown in FIG. 15A, a spectrum C20 reflected from the optical fiber sensor 17 can be seen with a peak at a wavelength $\lambda 0$. A variety of large loads are then applied to the bolt 10 using the members 63, 69 shown in FIG. 14.

FIG. 15B is a reflection spectrum C21 when a shear load of 40 kgf was applied. The reflection spectrum changes; several peaks are generated, and the highest-intensity peak is generated at wavelength $\lambda 1$, a wavelength longer than the wavelength $\lambda 0$. The underlying reason is believed to be that the application of a shear load on the bolt 10 causes the bolt 10 to undergo bending deformation, a corresponding strain is generated in the sensor part 17s of the optical fiber sensor 17, and sections of the sensor part 17s wherein the refractive-index period grows longer than before the application of the load are generated on the sensor part 17s.

Further shear loads were applied to the bolt 10. The reflection spectrum C22 shown in FIG. 15C is from when a load of 80 kgf was applied. The highest-intensity peak is generated further down the long-wavelength side, at a wavelength $\lambda 2$. FIG. 15D shows a reflection spectrum C23 from when a load of 120 kgf was applied to the bolt 10; FIG. 15E shows a reflection spectrum C24 from when a load of 160 kgf was applied to the bolt 10; and FIG. 15F shows a reflection spectrum C25 from when a load of 200 kgf was applied to the bolt 10. The position of the highest-intensity peak in the reflection spectrum shifts to the long-wavelength side when the load on the bolt 10 is increased. The underlying reason is believed to be that the bending deformation of the bolt 10 increases due to the increase in load, and sections wherein the refractive-index period is lengthened are generated on the sensor part 17s of the optical fiber sensor 17 that is embedded in a channel of the bolt 10.

FIGS. 16A through 16F are different spectral data of reflection from the optical fiber sensor 17 when a variety of loads were applied to the bolt 10. These measurements are data for when the direction of the line segment that joins the central axes of the sensor part 17s and the bolt 10 was parallel to the direction of the shear load, and when the force with which the bolt 10 was tightened was relatively strong. These data are used to form a database. The horizontal axis represents the wavelength and the vertical axis represents the optical intensity.

When a shear load is not applied; i.e., when the load is 0 kgf, as shown in FIG. 16A, a spectrum C30 reflected from the optical fiber sensor 17 can be seen with a peak at a wavelength $\lambda 0$. A variety of large loads are then applied to the bolt 10 using the members 63, 69 shown in FIG. 14.

FIG. 16B is a reflection spectrum C31 when a load of 40 kgf was applied. The reflection spectrum changes, several peaks are generated, and the highest-intensity peak is generated at a wavelength $\lambda 3$. The underlying reason is believed to be that the application of a shear load on the bolt 10 causes the bolt 10 to undergo bending deformation, a corresponding strain is generated in the sensor part 17s of the optical fiber sensor 17, and sections of the sensor part 17s wherein the refractive-index period grows longer than before the application of the load are generated on the sensor part 17s.

Further loads were applied to the bolt 10. The reflection spectrum C32 shown in FIG. 16C is from when a load of 80 kgf was applied. The highest-intensity peak is generated further down the long-wavelength side, at a wavelength $\lambda 4$. FIG. 16D shows a reflection spectrum C33 from when a load of 120 kgf was applied to the bolt 10; FIG. 16E shows a reflection spectrum C34 from when a load of 160 kgf was applied to the bolt 10; and FIG. 16F shows a reflection spectrum C35 from when a load of 200 kgf was applied to the bolt 10. The position of the highest-intensity peak in the reflection spectrum shifts to the long-wavelength side when the load on the bolt 10 is increased. The underlying reason is believed to be that the bending deformation of the bolt 10 increases due to the increase in load, and sections wherein the refractive-index period is lengthened are generated on the sensor part 17s of the optical fiber sensor 17 that is embedded in a channel of the bolt 10.

FIGS. 17A through 17F are different spectral data of reflection from the optical fiber sensor 17 when a variety of loads were applied to the bolt 10. These measurements are data for when the direction of the line segment that joins the central axes of the sensor part 17s and the bolt 10 was perpendicular to the direction of the shear load, and when the force with which the bolt is tightened 10 was relatively weak. These data are used to form a database. The horizontal axis represents the wavelength and the vertical axis represents the optical intensity.

When a shear load is not applied; i.e., when the load is 0 kgf, as shown in FIG. 17A, a spectrum C40 reflected from the optical fiber sensor 17 can be seen with a peak at a wavelength $\lambda 0$. A variety of large loads are then applied to the bolt 10 using the members 63, 69 shown in FIG. 14.

FIG. 17B is a reflection spectrum C41 when a load of 40 kgf was applied. The reflection spectrum changes, several peaks are generated, and the highest-intensity peak is generated at a wavelength $\lambda 5$. The underlying reason is believed to be that the application of a shear load on the bolt 10 causes the bolt 10 to undergo bending deformation, a corresponding strain is generated in the sensor part 17s of the optical fiber sensor 17, and sections of the sensor part 17s wherein the refractive-index period grows longer than before the application of the load are generated on the sensor part 17s.

Further loads were applied to the bolt 10. The reflection spectrum C42 shown in FIG. 17C is from when a load of 80 kgf was applied. The highest-intensity peak is generated further down the long-wavelength side, at a wavelength $\lambda 6$. FIG. 17D shows a reflection spectrum C43 from when a load of 120 kgf was applied to the bolt 10; FIG. 17E shows a reflection spectrum C44 from when a load of 160 kgf was applied to the bolt 10; and FIG. 17F shows a reflection spectrum C45 from when a load of 200 kgf was applied to the bolt 10. The position of the highest-intensity peak in the reflection spectrum shifts to the long-wavelength side when the load on the bolt 10 is increased. The underlying reason is believed to be that the bending deformation of the bolt 10 increases due to the increase in load, and sections wherein the refractive-index period is lengthened are generated on the sensor part 17s of the optical fiber sensor 17 that is embedded in a channel of the bolt 10.

FIGS. 18A through 18F are different spectral data of reflection from the optical fiber sensor 17 when a variety of loads were applied to the bolt 10. These measurements are data for when the direction of the line segment that joins the central axes of the sensor part 17s and the bolt 10 was perpendicular to the direction of the shear load, and when the force with which the bolt 10 was tightened was relatively strong. These data are used to form a database. The horizontal axis represents the wavelength and the vertical axis represents the optical intensity. When a shear load is not applied; i.e., when the load is 0 kgf, a spectrum C50 reflected from the optical fiber sensor 17 can be seen with a peak at a wavelength $\lambda 0$. A variety of large loads are then applied to the bolt 10 using the members 63, 69 shown in FIG. 14. FIG. 18B is a reflection spectrum C51 when a load of 40 kgf was applied. The reflection spectrum changes, several peaks are generated, and the highest-intensity peak is generated at a wavelength $\lambda 7$. The underlying reason is believed to be that the application of a shear load on the bolt 10 causes the bolt 10 to undergo bending deformation, a corresponding strain is generated in the sensor part 17s of the optical fiber sensor 17, and sections of the sensor part 17s wherein the refractive-index period grows longer than before the application of the load are generated on the sensor part 17s.

The load applied to the bolt 10 was further increased. The reflection spectrum C52 shown in FIG. 18C is from when a load of 80 kgf was applied. The highest-intensity peak is generated further down the long-wavelength side, at a wavelength $\lambda 8$. FIG. 18D shows a reflection spectrum C53 from when a load of 120 kgf was applied to the bolt 10; FIG. 18E shows a reflection spectrum C54 from when a load of 160 kgf was applied to the bolt 10; and FIG. 18F shows a reflection spectrum C55 from when a load of 200 kgf was applied to the bolt 10. The position of the highest-intensity peak in the reflection spectrum shifts to the long-wavelength side when the load on the bolt 10 is increased. The underlying reason is believed to be that the bending deformation of the bolt 10 increases due to the increase in load, and sections wherein the refractive-index period is lengthened are generated on the sensor part 17s of the optical fiber sensor 17 that is embedded in a channel of the bolt 10.

A database is made of the reflection spectral data that were obtained by the above measurements for shear loads applied to the bolt 10, whereby, conversely, a shear load on the bolt 10 can be measured by measuring the spectrum reflected from the optical fiber sensor 17 that is embedded in the bolt 10 and referring to that reflection spectrum in the database.

A database obtained as above for relating optical characteristics with corresponding shear loads is used in step S23 in the flow chart shown in FIG. 1. The shear load on the fastening tool is evaluated in step S24 based on the measured optical characteristics of the optical fiber sensor and the database that relates optical characteristics with corresponding shear loads. The shear load on each bolt can be measured via these steps by referencing the reflection spectra in the database shown in FIGS. 15A through 15F, FIGS. 16A through 16F, FIGS. 17A through 17F, and FIGS. 18A through 18F in relation to the force with which the bolts are tightened and the positional relationship of the optical fiber sensor and the bolt axis in each bolt.

As an example, the positional relationship of the bolt axis and the optical fiber sensor 34 that is attached to the bolt 22 will be made with the direction of the line segment that joins the central axes of the sensor part 34s and the bolt 22 being parallel to the direction of the shear load, and the force with which the bolt 22 is tightened being relatively strong. In this example, a reflection spectrum that is substantially equivalent to the reflection spectrum shown in FIG. 15C will be obtained as the optical characteristics of the optical fiber sensor 34. By referencing the resulting reflection spectrum against the database in the memory of the personal computer 54, the shear load on the bolt 22 can be measured as 80 kgf. Values for the other bolts can be determined in the same manner.

Measuring the reflection spectra when using the above measurement system to measure the load on the bolts of a bolted joint employed in aircraft fuselages allows the fuselage to be designed with a higher degree of accuracy.

Data in which reflection spectra were correlated with loads was used as the database in the measurement system 50 above, but a relationship in which wavelengths of the highest-intensity peaks of a reflection spectrum are correlated with loads may also be used as the database. The wavelengths of the highest-intensity peak of the measured reflection spectrum are measured in such instances, and the load may be estimated from the corresponding peak wavelength in the database.

Figure 19:
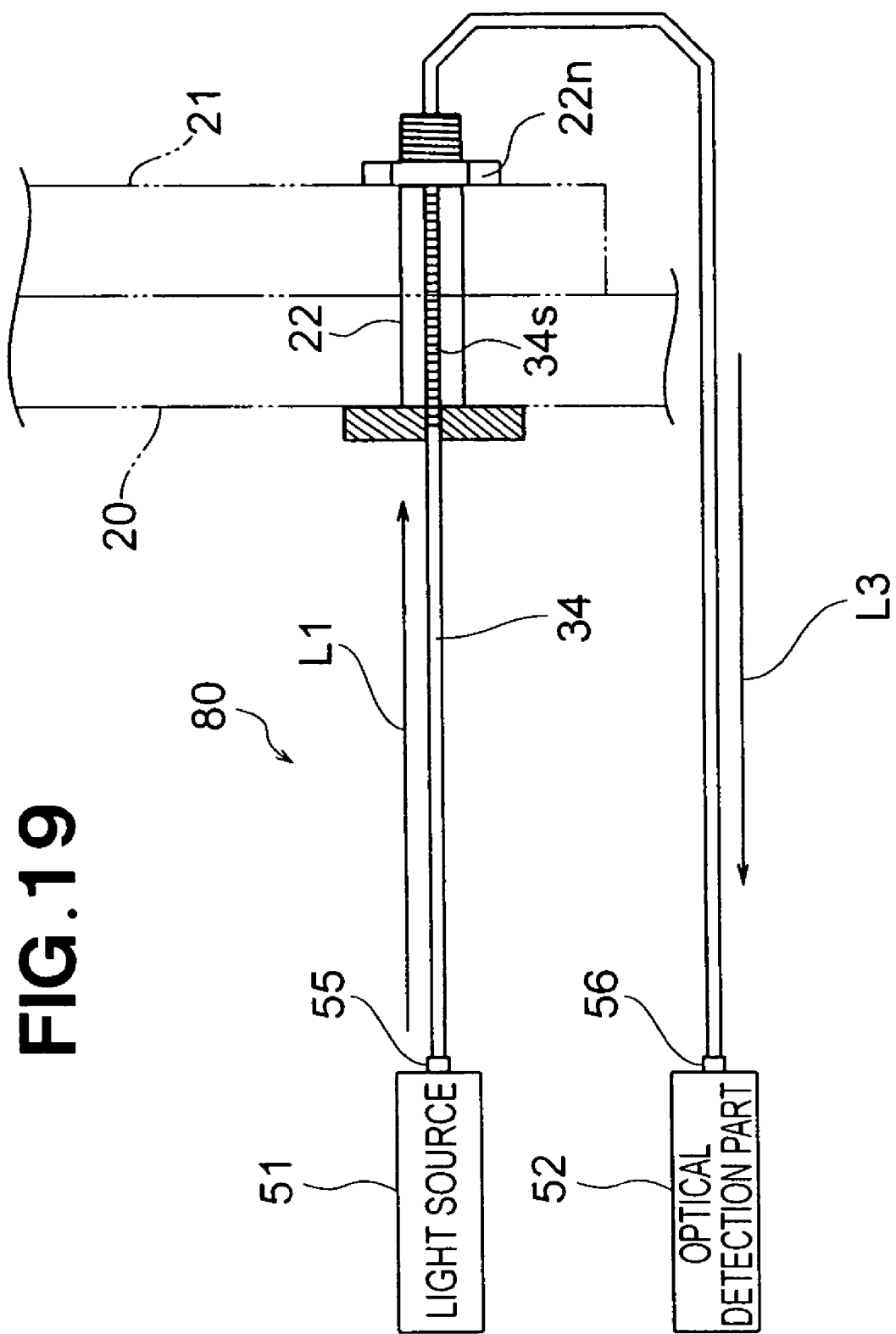
FIG. 19 is a schematic view of the measurement system used in the method for measuring a shear load acting on a fastening tool, according to a second embodiment of the present invention.

FIG. 19 is a basic structural diagram of the measurement system used in a method for measuring shear load on a fastening tool, according to a second embodiment of the present invention. Of the optical fiber sensors 34 through 45 that are provided to the plurality of bolts 22 through 33 shown in FIGS. 5 and 6, the optical fiber sensors that are provided to bolts for which shear load is to be measured are connected to the light source 51 on one end and are connected to the optical detection part 52 on the other end. The measurement of the shear load on the bolt 22 will be described in this example.

Since the light source 51 and the optical detection part 52 are the same as in the first embodiment, the same notation will be used and a description will be omitted.

The optical fiber sensor 34 has a sensor part 34s, introduces light (incident light L1) from the light source 51 into the sensor part 34s, and detects light L3 transmitted from the sensor part 34s.

The optical detection part 52 shown in FIG. 19 uses an optical spectrum analyzer to obtain transmission spectra of the light L3 transmitted from the sensor part 34s.

The principles of measurement according to the measurement system 80 of the method for measuring shear load on a fastening tool of the present invention will be described next.

The aforedescribed fiber grating 34g is formed in the middle of the optical fiber sensor 34, but is otherwise the same as in the first embodiment. Since the fiber grating 34g has light-wavelength-order cycles written in the fiber-core part, the fiber grating 34g has a function of reflecting light of a prescribed wavelength by using a coupling of forward and return modes that propagate through the core. A coupled wavelength $\lambda_B$ is described by the aforedescribed equation (1) using an effective refractive index $n_{core}$ of the propagation mode and a refractive index period $\Lambda$.

Reflectivity R is determined with the aforedescribed equation (2) using a change in refractive index $\Delta n$, a grating length L, and a confinement $\eta_c$ of propagated light in the core part.

Figure 20:
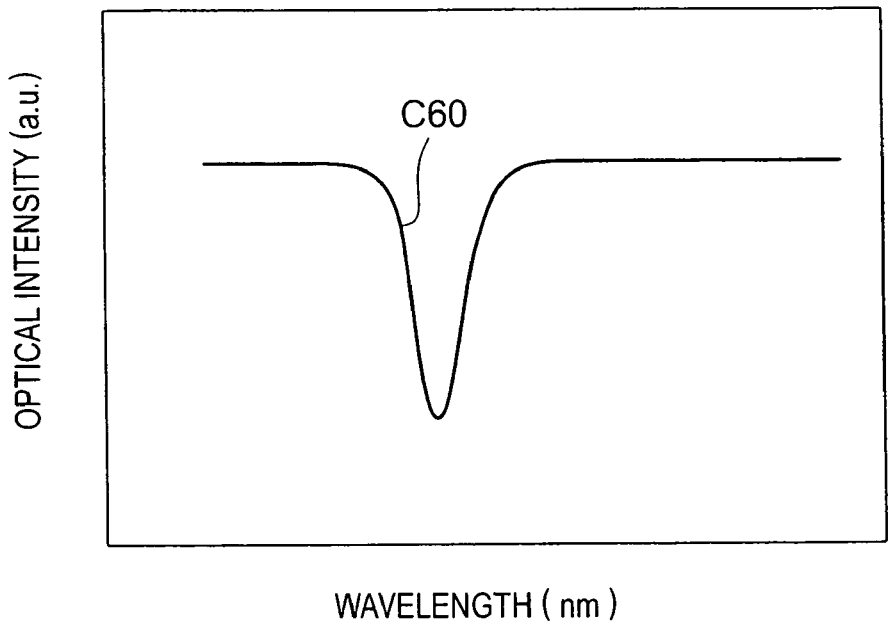
FIG. 20 is a graph showing the characteristics of transmission from the fiber grating.

In the case of an optical fiber grating sensor that is used for wavelength separations of 1.55 μm-band wavelength multiplex transmission, for example, refractive index cycles having a period $\Lambda$ of approximately 0.5 μm are written over a length L of 10 mm, making approximately 20,000 layers and forming an extremely steep characteristic transmission curve C60, as shown in FIG. 20.

Figure 21:
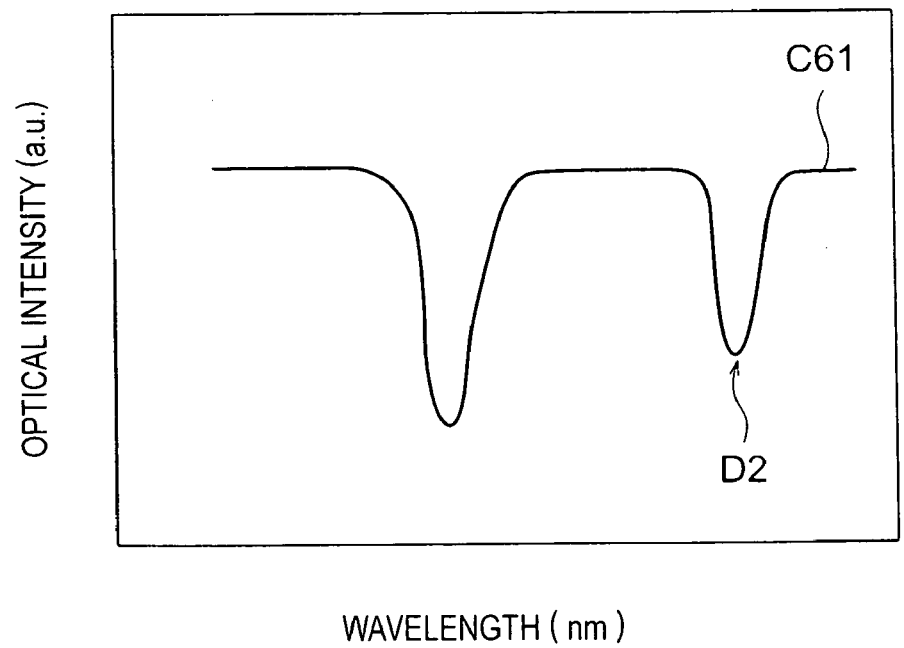
FIG. 21 is a graph showing the characteristics of transmission from the fiber grating when tensile strain is generated.

The refractive index period $\Lambda$ shortens to $\Lambda c$ when a compressive strain is applied to such a grating, as shown in FIG. 11, and, in accordance with the equation (1), the wavelength of the reflected light also shortens. When tensile strain is applied, however, the refractive index period $\Lambda$ lengthens and the wavelength of light reflected from the grating lengthens. A transmission dip D2 also occurs on the long-wavelength side, as shown by the characteristic transmission curve C61 in FIG. 21. When shear force is applied to the bolt 22 and the bolt 22 undergoes bending deformation, a transmission dip also occurs on the long-wavelength side.

With the aforementioned principles used as a basis, the measurement system 80 measures the transmission spectrum of the optical fiber sensor 17, which, as with the optical fiber sensors 34 through 45, is provided in advance to the bolt 10, which is identical to the bolts 22 through 33. A database of transmission spectra for each shear load (the database in the other example relating optical characteristics with corresponding shear loads) is created. Next, the bolts 22 through 33 are physically inserted through two plates as shown in FIGS. 5 and 6, and measurements are made of the transmission spectra or the wavelengths of the largest transmission dips in the transmission spectra of the optical fiber sensors 34 through 45 provided to the inserted bolts 22 through 33. The shear load on each bolt 22 through 33 can then be measured by referencing the measured data against the database of transmission spectra for shear loads.

The shear load on each bolt can be measured with a higher degree of accuracy by using the above measurement system 80 to measure the shear load on the bolts of a bolted joint of an aircraft fuselage, with the transmission spectra of the optical fiber sensors provided to each bolt being measured and compared to a database of transmission spectra for previously measured loads.

The optical fiber sensor was embedded in the surface of the fastening tool parallel to the axial direction of the fastening tool in each of the above examples, but the optical fiber sensor may also be helically embedded in the surface of the fastening tool around the axis of the fastening tool. Additionally, the above examples were described using a bolt as the fastening tool, but rivets, pins, or other fastening tools may be used.

The configurations, shapes, sizes, and positional relationships described in the present examples are general descriptions provided merely to facilitate comprehension and implementation of the present invention. For example, one optical fiber sensor was embedded in each bolt in the present examples, but two or a plurality may also be embedded. Additionally, the numerical values and the composition (materials) of each configuration are provided merely by way of example. The present invention is therefore not limited to the examples described above, and a variety of aspects may be changed as long as no departure is made from the scope of the technical concepts presented in the claims.

The present invention is used as a method for measuring the load on a fastening tool in a joint that uses bolts or other fastening tools.

Obviously, various minor changes and modifications of the present invention are possible in light of the above teaching. It is therefore to be understood that within the scope of the appended claims the invention may be practiced otherwise than as specifically described above.

What is claimed is:

1. A method for measuring a shear load of a fastening tool, comprising the steps of:
    positioning an optical fiber sensor on a surface of a fastening tool to be subjected to a measurement, at least part of the surface being threaded, the fastening tool having a cylindrical shape with a central longitudinal axis, or within the tool but near the surface thereof and spaced from the central longitudinal axis, so that the optical fiber sensor is positioned in a direction of the central longitudinal axis of the fastening tool; and
    measuring the shear load acting on the fastening tool on the basis of a change in an optical characteristic of the optical fiber sensor that directly corresponds to a deformation of the fastening tool when the shear load is applied to the fastening tool.

2. The method of claim 1, wherein the deformation is a bending deformation.

3. The method of claim 1, wherein the measuring step comprises a step for determining the shear load based on a database that relates an optical characteristic with a corresponding shear load.

4. The method of claim 1, wherein the optical fiber sensor is positioned parallel to the central longitudinal axis of the fastening tool.

5. The method of claim 1, wherein the optical fiber sensor is disposed in a helical shape around the central longitudinal axis of the fastening tool.

6. The method of claim 1, wherein a length of the optical-fiber sensor part is equal to a thickness of at least two overlaid fastened members.

7. The method of claim 1, wherein the length of the optical-fiber sensor part is identical to a length of a trunk part of the fastening part, which is composed of a head part, the trunk part, and a screw part.

8. The method of claim 1, wherein the optical fiber sensor is an optical fiber grating sensor.

9. The method of claim 1, wherein the optical characteristic is a reflected light characteristic.

10. The method of claim 1, wherein the optical characteristic is an optical transmission characteristic.

11. The method of claim 1, wherein the optical fiber sensor is placed on a surface of a fastening tool.

12. The method of claim 1, wherein the optical fiber sensor is closer to the surface than the central longitudinal axis.

13. A method for measuring a shear load of a fastening tool, comprising the steps of:

positioning an optical fiber sensor on a surface of a fastening tool to be subjected to a measurement, at least part of the surface being threaded, so that the optical fiber sensor is positioned in a direction of a longitudinal axis of the fastening tool;

measuring the shear load acting on the fastening tool on the basis of a change in an optical characteristic of the optical fiber sensor that directly corresponds to a deformation of the fastening tool when the shear load is applied to the fastening tool, and wherein the optical fiber sensor is embedded via an adhesive in a channel formed in the surface of the fastening tool in a direction of the longitudinal axis of the fastening tool.

14. A method for measuring a shear load of a fastening tool, comprising:

forming a fastening tool having a first end, a second end and a shank having an outer surface extending between the first and second ends;

forming a channel in the outer surface;

placing an optical sensor in the channel; and measuring the load acting on the fastening tool on the basis of a change in an optical characteristic of the optical sensor.

15. The method of claim 14, wherein the outer surface is cylindrical.

16. The method of claim 14, further comprising:
forming a first hole in the first end;
forming a second hole in the second end; and
the first hole and second hole communicating with the channel.

17. The method of claim 14, further comprising:
bonding the optical sensor in the channel with an adhesive.

* * * * *